(12) United States Patent
Ahn et al.

(10) Patent No.: US 11,393,433 B2
(45) Date of Patent: Jul. 19, 2022

(54) APPARATUS AND METHOD FOR PROCESSING WINDSHIELD TO BE INVISIBLE

(71) Applicant: HYUNDAI MOBIS Co., Ltd., Seoul (KR)

(72) Inventors: Sung Joon Ahn, Yongin-si (KR); Tae Hun Kim, Yongin-si (KR); Seung Hwan Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/072,405

(22) Filed: Oct. 16, 2020

(65) Prior Publication Data

US 2021/0118411 A1 Apr. 22, 2021

(30) Foreign Application Priority Data

Oct. 17, 2019 (KR) .......................... 10-2019-0129480

(51) Int. Cl.
 *G09G 5/38* (2006.01)
 *G09G 5/377* (2006.01)
 (Continued)

(52) U.S. Cl.
 CPC .............. *G09G 5/38* (2013.01); *B60K 35/00* (2013.01); *G02B 27/0101* (2013.01); *G02B 27/0179* (2013.01); *G06F 3/013* (2013.01); *G06V 20/56* (2022.01); *G09G 5/377* (2013.01); *B60K 2370/149* (2019.05); *B60K 2370/152* (2019.05);
 (Continued)

(58) Field of Classification Search
 CPC ...... G09G 5/38; G09G 5/377; G09G 2380/10; G09G 2354/00; G09G 2340/12; G06K 9/00791; G06K 9/3233; G06K 9/00604; G02B 27/0101; G02B 27/0179; G02B 27/01; G02B 2027/0141; G02B 2027/0187; G02B 2027/0138; G02B 2027/014; B60K 35/00; B60K 2370/176; B60K 2370/152; B60K 2370/149; B60K 2370/37;
 (Continued)

(56) References Cited

U.S. PATENT DOCUMENTS

| 2013/0307771 | A1* | 11/2013 | Parker | ..................... | G06F 3/167 |
| | | | | | 345/158 |
| 2017/0269370 | A1* | 9/2017 | Sato | ......................... | B60R 1/00 |
| 2020/0035197 | A1* | 1/2020 | Suddreth | .............. | G02B 27/017 |

FOREIGN PATENT DOCUMENTS

| KR | 10-15206600000 | 5/2015 |
| KR | 10-2020-0063332 | 6/2020 |

* cited by examiner

*Primary Examiner* — Brent D Castiaux
(74) *Attorney, Agent, or Firm* — H.C. Park & Associates, PLC (57) ABSTRACT

Inventive concepts are configured to protect a passenger by processing an area in a windshield, which matches to a position of a spot on a road, wherein the spot is defined as desirable to not be seen by the passenger when a vehicle is travelling. To this end, the area in the windshield, which matches to a spot on an actual road defined in advance as desirable to not be seen by the passenger, is processed as an invisible area for passenger protection so that the passenger is prevented from visually recognizing the spot. However, when road information required for driving of the vehicle is occluded due to the invisible area which is processed or displayed on the windshield, safe driving is significantly disrupted so that actual road information is overlaid on the invisible area.

13 Claims, 10 Drawing Sheets

(51) Int. Cl.
*G02B 27/01* (2006.01)
*B60K 35/00* (2006.01)
*G06F 3/01* (2006.01)
*G06V 20/56* (2022.01)
*G02F 1/163* (2006.01)

(52) U.S. Cl.
CPC ............... *B60K 2370/176* (2019.05); *G02B 2027/0141* (2013.01); *G02B 2027/0187* (2013.01); *G02F 1/163* (2013.01); *G09G 2354/00* (2013.01); *G09G 2380/10* (2013.01)

(58) Field of Classification Search
CPC ... B60K 2370/785; B60K 37/06; G06F 3/013; G02F 1/163; H04N 5/225
See application file for complete search history.

APPARATUS AND METHOD FOR PROCESSING WINDSHIELD TO BE INVISIBLE

CROSS-REFERENCE TO RELATED APPLICATION

This application claims priority from and the benefit of Korean Patent Application No. 10-2019-0129480, filed on Oct. 17, 2019, which is hereby incorporated by reference for all purposes as if set forth herein.

BACKGROUND

Field

Exemplary embodiments relate to a technology for displaying information on a windshield, and more particularly, to a processing of a windshield to be invisible so as to provide a driver and a passenger with visual consideration, driving safety, and comfortable travel.

Discussion of the Background

There are techniques for displaying an image on a front window of a vehicle (windshield). For example, there is a technique having a concept of displaying an image on the windshield of the vehicle using an image projector to emit a predetermined image to the windshield, and a film to adjust light transmittance and reflectance of the image emitted from the image projector (for example, a polymer dispersed liquid crystal (PDLC)).

In addition, there is a display technique using an electrochromic film. The display technique is a relatively new display technique using the property of the electrochromic film which becomes opaque or transparent according to whether power is applied.

Meanwhile, during driving, there are cases in which quite a few scenes are witnessed, such as animal roadkill, personnel accidents, unattended garbage, excrement, etc. These spots give a feeling of disgust, fear, or displeasure to a driver and also accompanying passengers, and most of all, the spots negatively affect the driver who needs to drive in a comfortable and stable mental state and the passengers who want to enjoy a comfortable trip. Thus, the spots interfere with safe driving and make the driver and passengers experience uncomfortable and unpleasant driving.

The above information disclosed in this Background section is only for enhancement of understanding of the background of the invention and, therefore, it may contain information that does not constitute prior art.

SUMMARY

The present invention is directed to proposing a technology configured to protect a driver and a passenger (hereinafter, called as 'passenger') by preventing the passenger from seeing an area within a windshield which matches to a position of a spot on a road where it is desirable for the passenger to not see during driving.

Additional features of the invention will be set forth in the description which follows, and in part will be apparent from the description, or may be learned by practice of the invention.

To solve the problems, the area within the windshield which matches to a scene of an actual road (e.g., animal roadkill, personnel accidents, waste such as garbage, and excrement, or the like), which is previously defined as being desirable for the passenger to not see, is processed as an invisible area for protecting the passenger so that the passenger is prevented from visually recognizing the spot (for example, a blur processing, transparency/density adjustment, a mosaic processing, a block processing, and the like). However, when road information (e.g., traffic signs, signals, lane borders, a center line, signs printed on the road, and the like) is occluded due to the invisible area which is processed or displayed on the windshield, safe driving is significantly disrupted and thus actual road information is overlaid on the invisible area.

In order to implement the above description, a display such as a transparent liquid crystal display (LCD) or organic light-emitting diode (OLED) is applied to the windshield so that it is possible to directly display the invisible area and road information, which is present in the invisible area, on a partial area of the windshield. Alternatively, an electrochromic film is applied to the windshield so that the invisible area may be selectively processed to be invisible, and a road information image may be output (projected) on the processed invisible area using a projector or the like.

The road information image which is present on the actual road may be acquired by a camera and sent to a transparent LCD or OLED applied to a windshield to be overlaid with and displayed on the invisible area or to be projected to the electrochromic film using the projector or the like.

Alternatively, because the invisible area is moved as the vehicle is travelling, it is preferable to process the invisible area to be moved in position in the windshield according to a driving direction of the vehicle.

Alternatively, in consideration of a difference between gaze positions of the driver and the accompanying passenger, it is desirable to recognize the driver's gaze and the accompanying passenger's gaze and process or display a position of the invisible area to be moved within the windshield with respect to the driver's gaze and the accompanying passenger's gaze. In this case, the gaze recognition may be performed by identifying eye tracking and a seating posture (face and eye positions) using a camera in the vehicle. Here, the accompanying passenger means a passenger in a passenger seat (or a passenger in a rear seat).

The above-described configurations and operations of the present invention will become more apparent from embodiments described in detail below with reference to the accompanying drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

The above and other objects, features and advantages of the present invention will become more apparent to those of ordinary skill in the art by describing exemplary embodiments thereof in detail with reference to the accompanying drawings, in which.

DETAILED DESCRIPTION

The invention is described more fully hereinafter with reference to the accompanying drawings, in which embodiments of the invention are illustrated. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the present invention will be described in more detail with reference to the accompanying drawings.

Advantages and features of the present invention and methods for achieving them will be made clear from embodiments described in detail below with reference to the accompanying drawings. However, the present invention may be embodied in many different forms and should not be construed as being limited to the embodiments set forth herein. Rather, these embodiments are provided so that this disclosure will be thorough and complete and will fully convey the scope of the present invention to those of ordinary skill in the technical field to which the present invention pertains. The present invention is defined by the claims. Meanwhile, terms used herein are for the purpose of describing the embodiments and are not intended to limit the present invention. As used herein, the singular forms include the plural forms as well unless the context clearly indicates otherwise. The term "comprise" or "comprising" used herein does not preclude the presence or addition of one or more other elements, steps, operations, and/or devices other than stated elements, steps, operations, and/or devices.

Hereinafter, exemplary embodiments of the present invention will be described in detail with reference to the accompanying drawings. In adding reference numerals to elements of each drawing, the same elements may have the same reference numeral as much as possible even if the elements are illustrated in different drawings. Further, in describing the present invention, the detailed description of a related known configuration or function will be omitted when it obscures the gist of the present invention.

Figure 1:
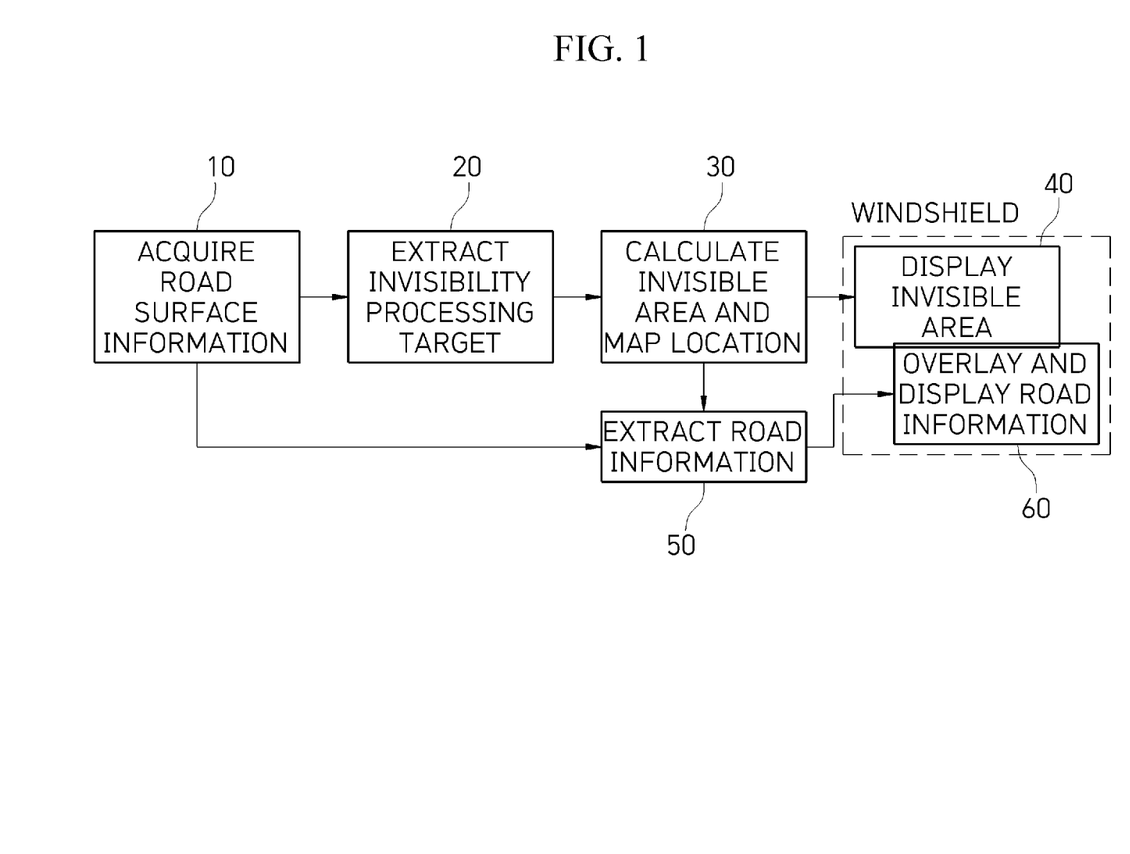
FIG. 1 illustrates a block diagram of a basic embodiment of the present invention.

FIG. 1 illustrates a block diagram of a basic embodiment of the present invention.

First, road surface information is acquired (10). The acquisition of the road surface information (10) may be acquired as image information using an external camera of a vehicle. In addition to, it is also possible to receive the road surface information in the form of location information such as global positioning system (GPS) information or coordinate information using a vehicle-to-everything (V2X) method.

An invisibility processing target, that is, a spot outside of a vehicle which is defined so that a passenger may not see, is extracted from the road surface information (20). The extraction of the invisibility processing target from the road surface information may be performed by converting a feature of a predetermined invisibility processing target image into a database. In addition, it is possible to use machine learning such as deep learning and the like.

An invisible area in which the extracted invisibility processing target should be displayed in the windshield is calculated and an invisible area display position is derived by being mapped to a display area in the windshield (30).

Next, the invisible area is displayed in an area mapped to the invisible area display position in the windshield (40). The displaying of the invisible area at the invisible area display position mapped in the windshield may be implemented in two manners.

Figure 2:
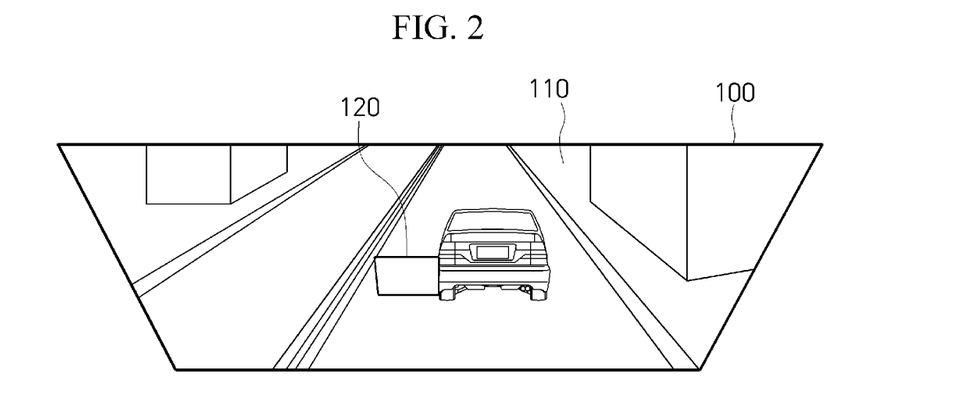
FIGS. 2 and 3 illustrate an invisible area displayed on a windshield.

A first manner is a method of applying a display such as a transparent LCD or OLED to the windshield and directly displaying the mapped invisible area on the LCD or OLED. For example, a blur, mosaic, or block processed image is directly displayed on the transparent LCD or OLED. Referring to FIG. 2, while a spot in front of the vehicle is visible through a transparent LCD or OLED 110 applied to a windshield 100, a blur-processed invisible area 120 is displayed.

Figure 3:
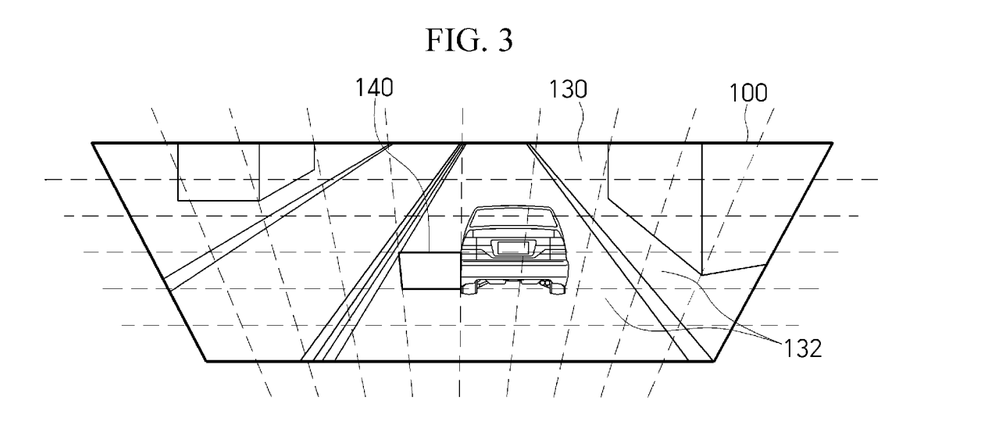

A second manner is a method of attaching an electrochromic film to the windshield, segmenting an electricity application section of the electrochromic film into subsections, and adjusting tone strength for each subsection, thereby displaying the invisible area. Referring to FIG. 3, it can be seen that segmented electricity application subsections 132 are present in a electrochromic film 130 applied to the windshield 100 and electricity is applied to an invisible area 140 located at the mapped location among the segmented electricity application subsections 132 so that the invisible area 140 is displayed by strength adjustment due to an electrochromic action.

Referring to FIG. 1 again, road information (e.g., essential or auxiliary driving information such as traffic signs, signals, lane borders, a center line, and signs printed on a road), which is present in an area corresponding to the invisibility processing target, is extracted from the road surface information (50). When the acquired road surface information is an image, the road information may be extracted using techniques such as letter recognition, character recognition, deep learning, and the like. When the road surface information is location information obtained through V2X, attribute information of a location corresponding to the invisibility processing target may be included in the location information so that the attribute information may be used.

Figure 4:
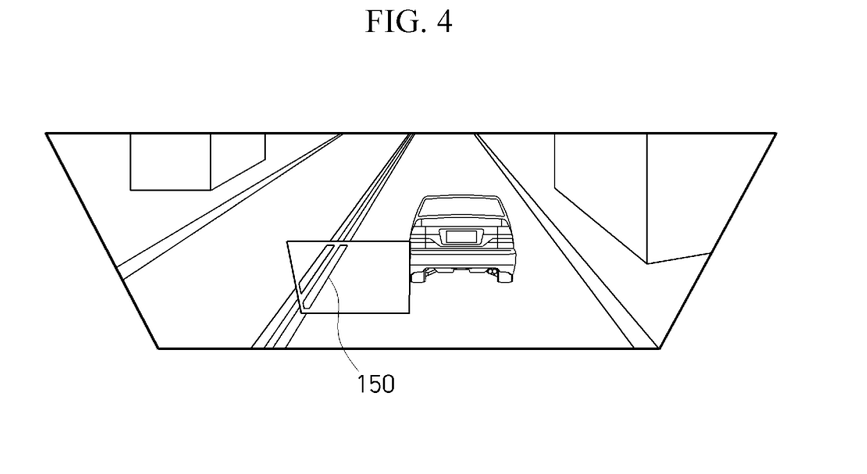
FIGS. 4 and 5 illustrate road information which is overlaid and displayed in the invisible area.
Figure 5:
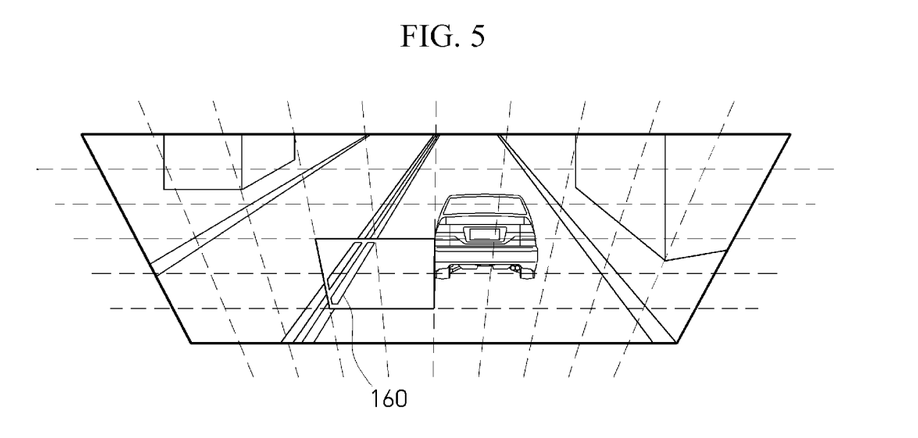

Lastly, the extracted road information is overlaid and displayed in the invisible area displayed in the windshield (60). As in the case of FIG. 2, as illustrated in FIG. 4 the transparent LCD or OLED display 110 applied to the windshield 100 may display road information 150 (in this example, the center line) together with the displaying of the invisible area 120. Meanwhile, in the case of the electrochromic film 130 applied to the windshield 100 in FIG. 3, an image of road information 160 (i.e., the center line) may be projected and displayed in the invisible area 140 by the strength adjustment due to the electrochromic action through a projector (not illustrated) separately installed in the vehicle or an equivalent device as illustrated in FIG. 5.

Figure 6:
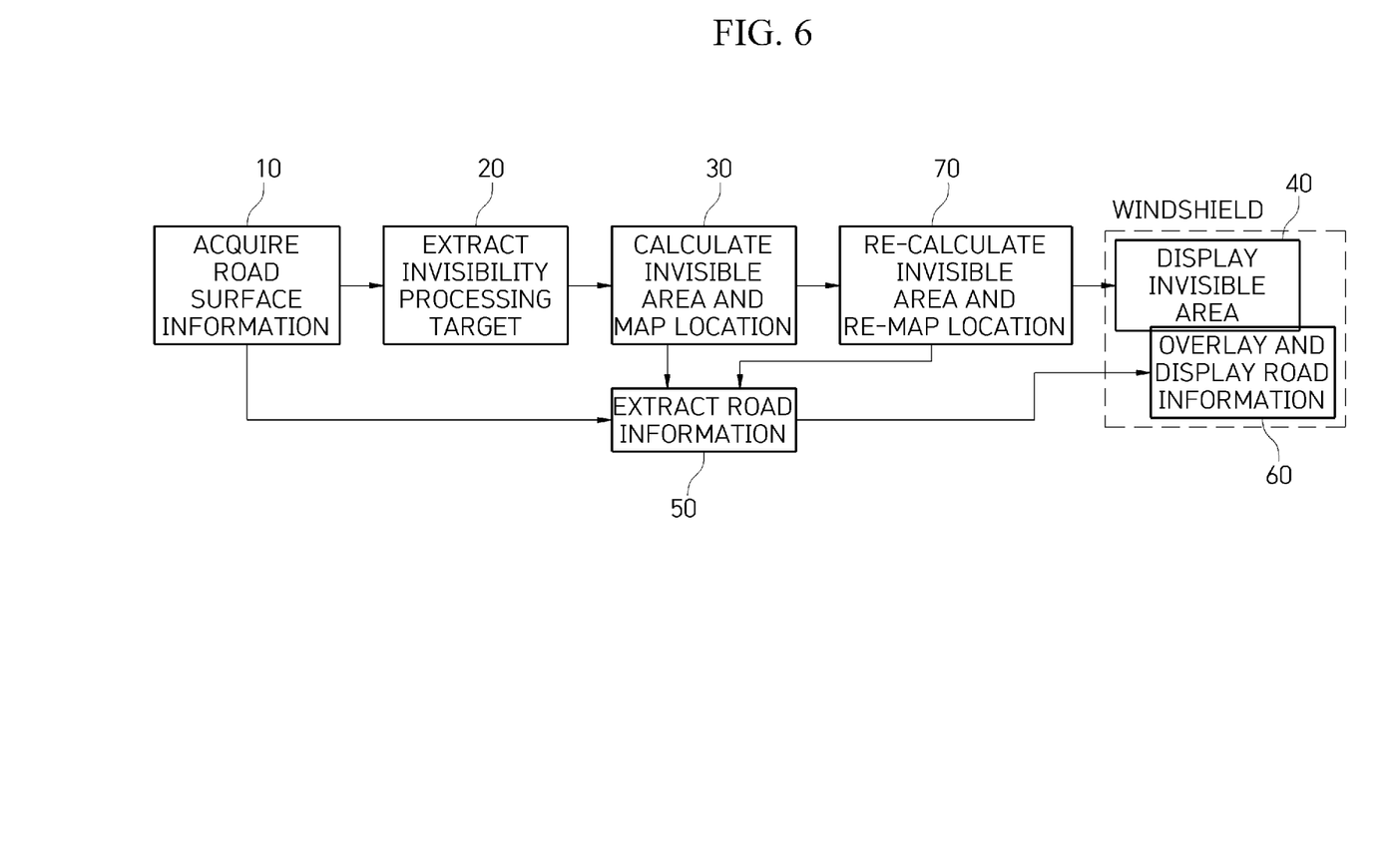
FIG. 6 illustrates a block diagram of a modified example of the basic embodiment of FIG. 1.

FIG. 6 illustrates a block diagram of an example modified from the basic embodiment of FIG. 1.

As the vehicle is moving forward, since the invisible area 40 approaches the vehicle, it is necessary to perform the mapping again so as to move the invisible area 40 in position within the windshield according to a driving direction of the vehicle to process the invisible area 40 to be continuously invisible to the driver. To this end, after the calculation and the location mapping of the invisible area (30), a component 70 of recalculating the extracted invisibility processing target area and re-mapping to an area within the windshield to change a mapping position is added.

When the acquired road surface information 10 is image information acquired from an external camera, in order to continuously track movement of the invisibility processing target, the mapping position changing component 70 may continuously extract the invisibility processing target among pieces of changed information of a corresponding image and perform an area recalculation and a location remapping with respect to each extracted target. When the acquired road surface information 10 is position data acquired through V2X, the mapping position changing component 70 may calculate a variation in relative position according to the movement of the vehicle from a fixed position of the invisibility processing target included in the position data.

Figure 7:
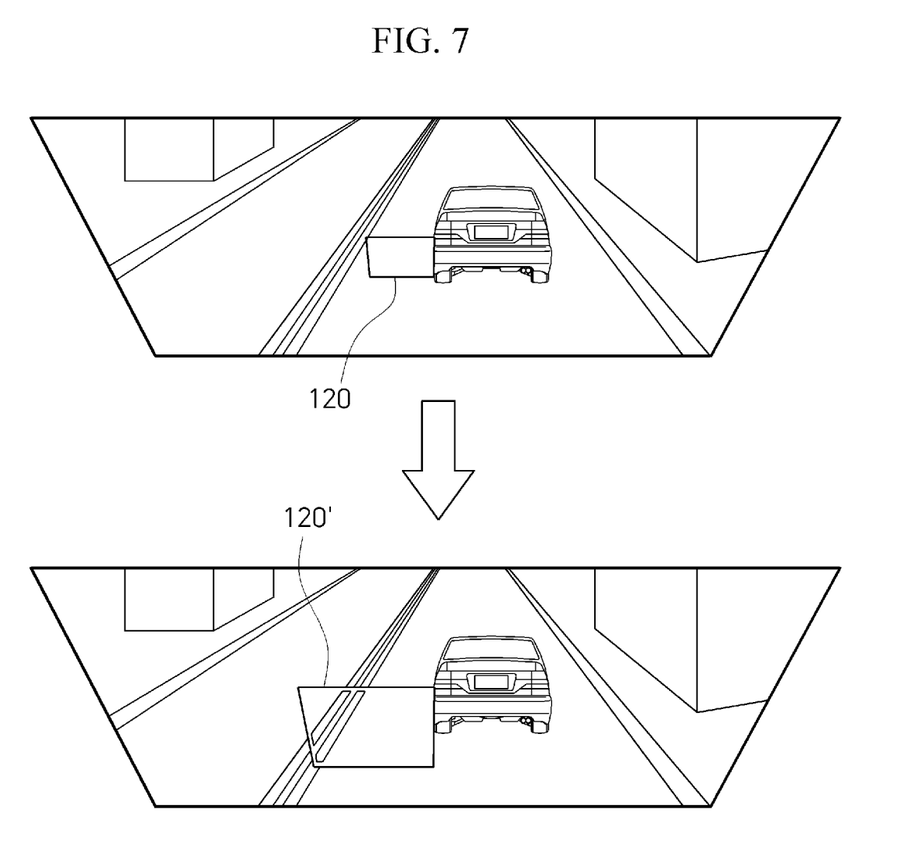
FIGS. 7 and 8 illustrate a movement display of the invisible area.

FIG. 7 illustrates an invisible area 120' which is moved to the bottom of the windshield 100 and increased in area thereof as the invisible area 120, which is displayed when the transparent LCD or OLED 110 is applied to the windshield 100, approaches the front of the vehicle.

Figure 8:
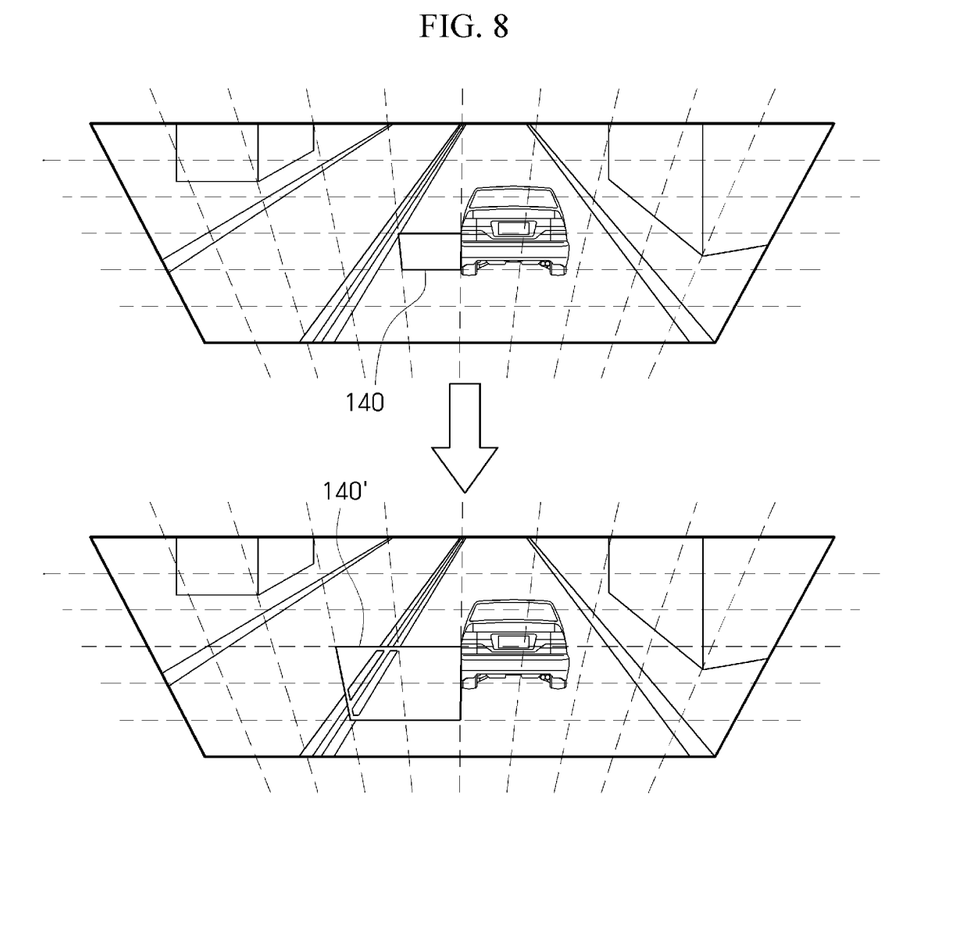

FIG. 8 illustrates a processed invisible area 140' which is moved to the bottom of the windshield 100 and increased in area thereof as, when the electrochromic film 130 is applied to the windshield 100, the invisible area 140 approaches the front of the vehicle.

Figure 9:
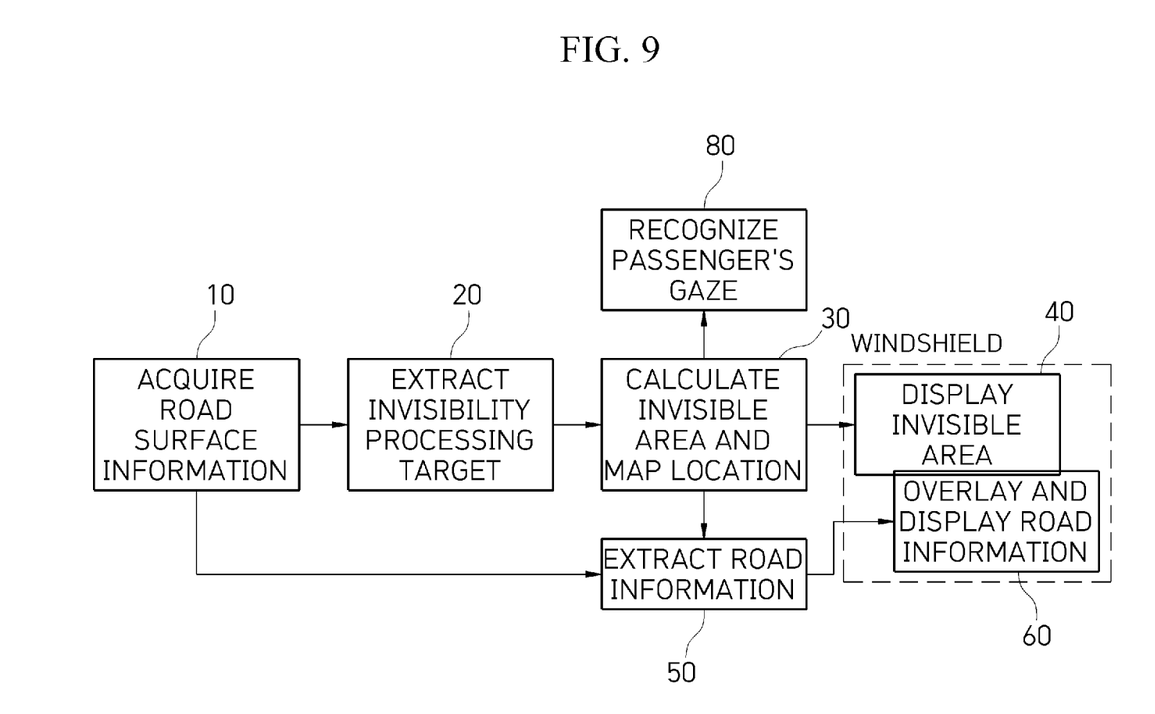
FIG. 9 illustrates a block diagram of a modified embodiment.

FIG. 9 is a block diagram of a modified embodiment of the embodiments of FIGS. 1 and 6, and the modified embodiment may be added to FIG. 1 or 6.

In the above embodiments, the passenger is described under the premise of being the driver. However, in consideration of gaze positions of the driver and the accompanying passenger being different from each other, the present embodiment is proposed so as to consider the different gaze positions of the driver and the accompanying passenger by recognizing the driver's gaze and the accompanying passenger's gaze and processing or displaying a position of an invisible area to be moved within the windshield.

In this embodiment, a passenger's gaze recognition component 80 includes a function of recognizing the driver's gaze by tracking of an eye of the driver and determining a seating posture (face and eye positions) using a camera or sensor (not illustrated) in the vehicle, and a function of recognizing the accompanying passenger's gaze by tracking of an eye of the accompanying passenger and determining a seating posture. Here, the accompanying passenger means a passenger in a passenger seat (or a passenger in a rear seat).

Figure 10:
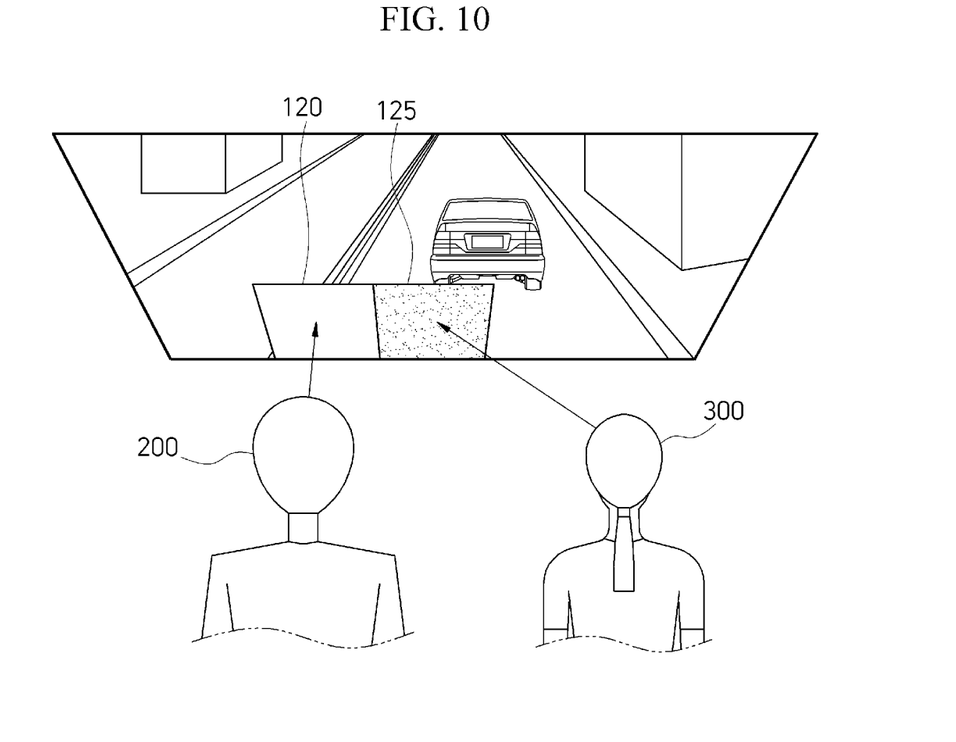
FIGS. 10 and 11 illustrate that an invisible area of a driver and an invisible area of an accompanying passenger are displayed at different gaze positions.

FIG. 10 illustrates that an invisible area, which is displayed when the transparent LCD or OLED display 110 is applied to the windshield 100, is displayed at different gaze positions as the invisible area 120 of a driver 200 and an invisible area 125 of an accompanying passenger 300 according to the gaze recognition results with respect to the driver 200 and the accompanying passenger 300.

Figure 11:
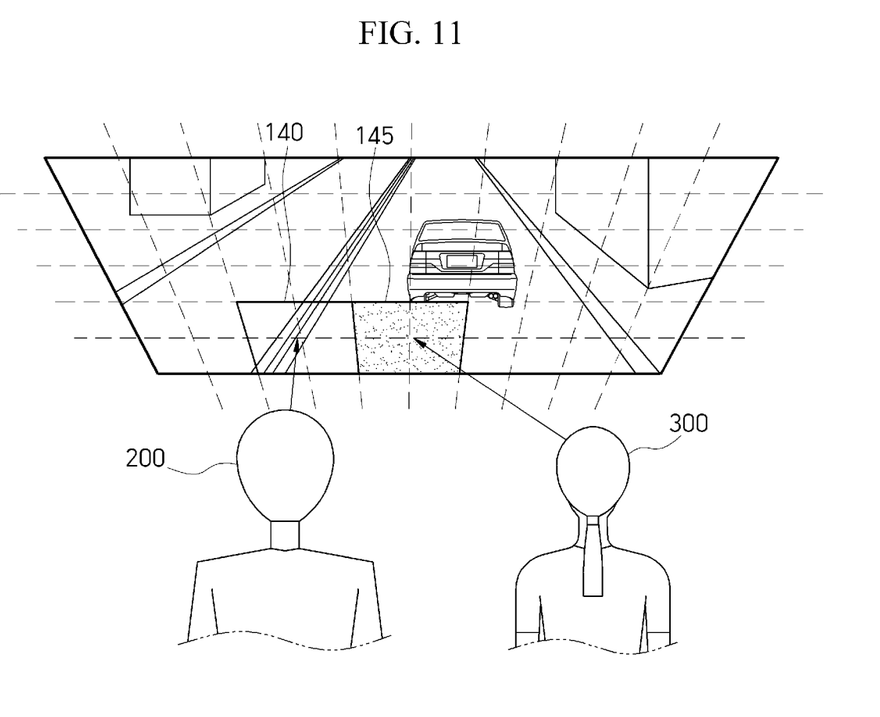

FIG. 11 illustrates that, when the electrochromic film 130 is applied to the windshield 100, an invisible area is made at different gaze positions as an invisible area 140 for the driver 200 and an invisible area 145 for the accompanying passenger 300 according to the gaze recognition results with respect to the driver 200 and the accompanying passenger 300.

Figure 12:
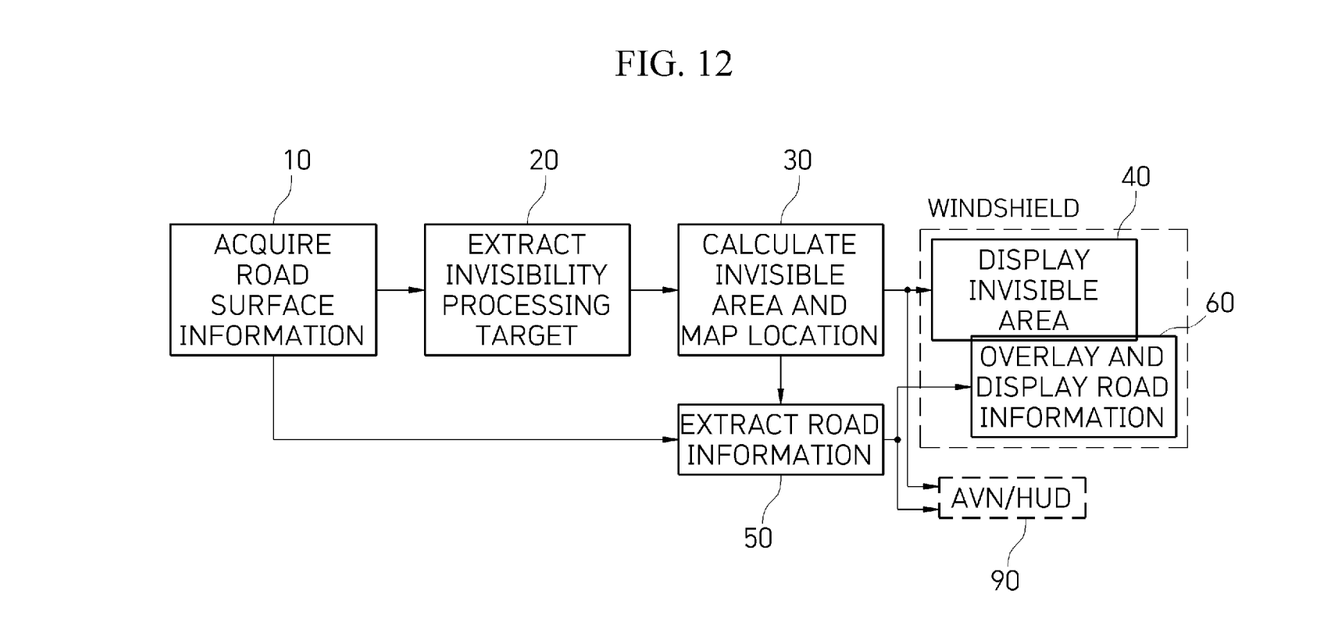
FIG. 12 illustrates a block diagram of another modified embodiment.

FIG. 12 illustrates another modified embodiment, and the another modified embodiment may be added to FIG. 1, 6, or 9.

The another modified embodiment is an embodiment in which, in addition to displaying of signals for the invisible areas 120 and 140 and the road information 150 and 160, the signals are sent to an Audio, Video, Navigation (AVN) or a head-up display (HUD), which is installed in the vehicle, and then displayed thereon. In particular, this embodiment may be an embodiment capable of responding to vehicle infotainment or autonomous driving.

In accordance with the present invention, during driving, a feeling of disgust, discomfort, or fear that a driver and accompanying passengers feel due to scenes such as animal road kill, personnel accidents, garbage, and excrement can be reduced so that the driver is allowed to drive in a comfortable and stable mental state and the accompanying passengers are allowed to enjoy a comfortable trip so that the present invention can contribute to safe driving and increase emotional quality of a vehicle.

While the present invention has been described in detail with reference to the exemplary embodiments, those skilled in the art can understand that the present invention can be implemented in other specific forms different from the content described herein without departing from the technical spirit or the necessary features of the present invention. It should be understood that the above-described embodiments are not restrictive but illustrative in all aspects. The scope of the present invention is defined by the appended claims rather than the detailed description, and it should be construed that all alternations or modifications derived from the meaning and scope of the appended claims and the equivalents thereof fall within the technical scope of the present invention.

What is claimed is:

1. An apparatus for a windshield, comprising:
   an invisible area display circuit configured to display an invisible area within a windshield that matches to a spot on a road defined in advance to not be seen by a passenger;

a road information display circuit configured to overlay and display road information in the invisible area displayed on the windshield by the invisible area display circuit;

a first invisible area moving circuit configured to move a display position of the invisible area in the windshield according to a moving of a vehicle;

a second invisible area moving circuit configured to recognize a driver's gaze and an accompanying passenger's gaze and move a display position of the invisible area in the windshield with respect to each of the driver's gaze and the accompanying passenger's gaze; and wherein the second invisible area moving circuit separately derives the invisible area as an invisible area of the driver and an invisible area of the accompanying passenger different from the invisible area of the driver according to the recognition results of the driver's gaze and the accompanying passenger's gaze.

2. The apparatus of claim 1, wherein the invisible area display circuit and the road information display circuit display the invisible area and the road information on a transparent display device included in the windshield.

3. The apparatus of claim 1, wherein the invisible area display circuit and the road information display circuit display the invisible area and the road information on an electrochromic film included in the windshield.

4. An apparatus for a windshield, comprising:

a road surface information acquisition circuit configured to acquire road surface information;

an invisibility processing target extraction circuit configured to extract a spot on a road, which is defined in advance to not be seen by a passenger, from the acquired road surface information;

an invisible area calculation and location mapping circuit configured to calculate an invisible area occupied by the extracted invisibility processing target in the windshield and map the invisible area to derive a display position of the invisible area in the windshield;

an invisible area display circuit configured to display the invisible area in an area mapped to a location in the windshield;

a road information extraction circuit configured to extract road information, which is present an area corresponding to the invisibility processing target, from the acquired road surface information; and a road information display circuit configured to overlay and display the extracted road information in the invisible area displayed in the windshield; and a driver and passenger invisible area deriving circuit configured to recognize a driver's gaze and a passenger's gaze and configured to separately derive the invisible area as an invisible area of the driver and an invisible area of the passenger different from the invisible area of the driver according to the recognition results of the driver's gaze and the passenger's gaze.

5. The apparatus of claim 4, further comprising an invisible area changing circuit configured to recalculate the display position of the invisible area mapped by the invisible area calculation and location mapping circuit with respect to an invisibility processing target area extracted by the invisibility processing target extraction circuit and re-map the display position of the invisible area to the area in the windshield, thereby changing the display position of the invisible area.

6. The apparatus of claim 4, wherein the road surface information acquisition circuit acquires the road surface information using an external camera of a vehicle.

7. The apparatus of claim 4, wherein the invisible area display circuit and the road information display circuit display the invisible area and the road information on a transparent display device included in the windshield.

8. The apparatus of claim 4, wherein the invisible area display circuit and the road information display circuit display the invisible area and the road information on an electrochromic film included in the windshield.

9. A method comprising:

displaying an invisible area in an area within a windshield that matches to a spot on a road defined in advance to not be seen by a passenger;

overlaying and displaying road information in the invisible area displayed on the windshield in the displaying of the invisible area;

recognize a driver's gaze and a passenger's gaze; and separately deriving the invisible area as an invisible area of the driver and an invisible area of the passenger different from the invisible area of the driver according to the recognition results of the driver's gaze and the passenger's gaze.

10. The method of claim 9, wherein, in the displaying of the invisible area and the displaying of the road information, the invisible area and the road information are displayed on a transparent display device included in the windshield.

11. The method of claim 9, wherein, in the displaying of the invisible area and the displaying of the road information, the invisible area and the road information are displayed on an electrochromic film included in the windshield.

12. The method of claim 9, further comprising moving a display position of the invisible area in the windshield according to driving of a vehicle.

13. The method of claim 9, further comprising recognizing the driver's gaze and the passenger's gaze and moving a display position of the invisible area in the windshield with respect to each of the driver's gaze and the passenger's gaze.

* * * * *